United States Patent [19]

Lauth et al.

[11] Patent Number: 5,573,585
[45] Date of Patent: Nov. 12, 1996

[54] MOLECULAR SIEVES CONTAINING AZO DYES

[75] Inventors: Guenter Lauth, Grosskarlbach; Wolfgang Hoelderich, Mannheimer Strasse 18c, 67227 Frankenthal; Gerhard Wagenblast, Wachenheim; Bernhard Albert, Maxdorf; Gunther Lamm, Hassloch; Helmut Reichelt, Neustadt; Clemens Grund, Mannheim; Sabine Gruettner-Merten, Bensheim, all of Germany

[73] Assignee: Wolfgang Hoelderich, Frankenthal, Germany

[21] Appl. No.: 295,679

[22] PCT Filed: Feb. 27, 1993

[86] PCT No.: PCT/EP93/00459

§ 371 Date: Sep. 12, 1994

§ 102(e) Date: Sep. 12, 1994

[87] PCT Pub. No.: WO93/17965

PCT Pub. Date: Sep. 16, 1993

[30] Foreign Application Priority Data

Mar. 11, 1992 [DE] Germany ............... 42 07 745.1

[51] Int. Cl.$^6$ ........................... C09B 27/00

[52] U.S. Cl. ................ 106/496; 106/400; 106/401; 106/402; 106/415; 106/467; 106/483; 106/493; 423/700; 423/704; 423/705; 423/706; 502/1; 502/62; 502/150; 502/162; 502/167

[58] Field of Search .................. 106/402, 415, 106/416, 467, 400, 401, 483, 493, 496; 502/1, 62, 150, 162, 167; 423/700, 704, 705, 706

[56] References Cited

U.S. PATENT DOCUMENTS

| | | | |
|---|---|---|---|
| 4,495,041 | 1/1985 | Goldstein | 204/158 R |
| 4,632,911 | 12/1986 | Goldstein | 502/62 |
| 5,360,474 | 11/1994 | Lauth et al. | 106/402 |

OTHER PUBLICATIONS

"Synthetic Dyes in Biology, Medicine and Chemistry", E. Gurr, Academic Press, London No Month Available 1971. pp. 182–184, 427, 429, 430, 439–442.

*Primary Examiner*—Mark L. Bell
*Assistant Examiner*—Scott L. Hertzog
*Attorney, Agent, or Firm*—Oblon, Spivak, McClelland, Maier & Neustadt, P.C.

[57] ABSTRACT

Crystalline molecular sieves useful as colorants contain one or more chromophores of the class of the mono- or polyazo dyes that are devoid of acidic groups.

10 Claims, No Drawings

MOLECULAR SIEVES CONTAINING AZO DYES

The present invention relates to novel crystalline molecular sieves which are thermally stable up to 500° C. and contain one or more chromophores of the class of the mono- or polyazo dyes that are devoid of acidic groups, except those monoazo dyes of the azobenzene series with a diphenylamine coupling component, and to the use thereof as colorants.

Molecular sieves are generally employed as adsorbents and as catalysts or catalyst supports (review article (in German): L. Puppe and W. Büchner, Zeolites—Structures, Syntheses, Applications, Naturwissenschaften 71 (1984), 192).

The adsorption properties of molecular sieves have hitherto been exploited in particular for relatively small molecules. For instance, the adsorption of water, nitrogen or else benzene can be used to characterize molecular sieves in that, for example, the nature of the adsorbed molecule and the shape of the adsorption isotherm provides information about the size and shape of the micropores, the pore volume, the phase purity or the presence of mesopores (described for example in D. W. Breck, Zeolite Molecular Sieves, Structure, Chemistry and Use, J. Wiley, New York 1974).

The adsorption of the molecules mentioned is reversible, ie. by means of a suitable treatment, for example raising the temperature, lowering the pressure or employing a solvent, it is possible to make the molecules bound to the molecular sieve desorb again without destroying them. This fact is exploited in the separation of mixtures of compounds.

The selective adsorption characteristics of alumophosphates are utilized for example in EP-A-130 740 in order to separate ortho-substituted aromatics from an isomer mixture.

G. Meyer et al. describe in Zeolites 4 (1984), 30, the ship-in-the-bottle synthesis of cobalt, nickel or copper phthalocyanines in the zeolite faujasite. By reacting the transition metal-exchanged zeolite with o-phthalodinitrile the dye is formed within the large (about 12 Å) supercages of the faujasite. Since these supercages are accessible only through openings about 7–8 Å in size, the o-phthalodinitrile can diffuse into the supercages, but the synthesized phthalocyanine, which is about 12–13 Å in size, cannot diffuse out for steric reasons. The authors see in the occluded complex a heterogenized homogeneous catalyst.

The preparation of the zeolite mordenite using triarylmethane dyes as templates is described in EP-A-182 542. The advantage of the method is said to be that, after the synthesis, the dyes are not situated within the pores of the molecular sieve—in contradistinction to most templates. Calcining, ie. burning the templates, is therefore unnecessary, making is possible to reuse the dye templates after the synthesis.

U.S. Pat. No. 4,018,870 discloses zeolites containing basic dyes of the class of the triarylmethane dyes.

Furthermore, Anal. Chem. 63 (1991), 348–51, describes the adsorption of 4-(phenylazo)diphenylamine.

Finally, DE-A-3 625 693 proposes condensing acid dyes with reactive compounds in the presence of acid-binding agents, for example zeolites.

It is an object of the present invention to occlude azo dyes so firmly within a molecular sieve structure that the originally soluble organic dyes are converted into a stable inclusion compound having pigment properties in order in this way to obtain novel colorants having advantageous application properties.

We have found that this object is achieved by the crystalline molecular sieves defined at the beginning, which contain azo dyes.

The azo dyes present in the molecular sieves belong to the class of the mono- or polyazo dyes, in particular to the class of the mono- or disazo dyes, of which monoazo dyes are particularly preferred. They are free of acidic groups. Acidic groups for the purposes of the present invention are for example hydroxysulfonyl and carboxyl.

The choice of chromophore is subject to the proviso that monoazo dyes of the azobenzene series, or simply monoazo dyes in general, shall not have a coupling component of the diphenylamine series.

Suitable azo dyes are known per se and have been described in large numbers, for example in K. Venkataraman, The Chemistry of Synthetic Dyes, Vol. VI, Academic Press, New York, London, 1972.

Of particular importance are monoazo dyes with a diazo component derived from an aniline or from a five-membered aromatic heterocyclic amine which has from one to three hetero atoms selected from the group consisting of nitrogen, oxygen and sulfur in the heterocyclic ring and may be fused with a benzene, thiophene, pyridine or pyrimidine ring.

Important monoazo dyes are for example those whose diazo component is derived for example from an aniline or from a heterocyclic amine of the pyrrole, furan, thiophene, pyrazole, imidazole, oxazole, isoxazole, thiazole, isothiazole, triazole, oxadiazole, thiadiazole, benzofuran, benzothiophene, benzimidazole, benzoxazole, benzothiazole, benzisothiazole, pyridothiophene, pyrimidothiophene, thienothiophene or thienothiazole series.

Of particular suitability are those diazo components which are derived from an aniline or from a heterocyclic amine of the pyrrole, thiophene, pyrazole, thiazole, isothiazole, triazole, thiadiazole, benzothiophene, benzothiazole, benzisothiazole, pyridothiophene, pyrimidothiophene, thienothiophene or thienothiazole series.

Of particular importance are monoazo dyes of the formula I

where

D is a radical of the formula

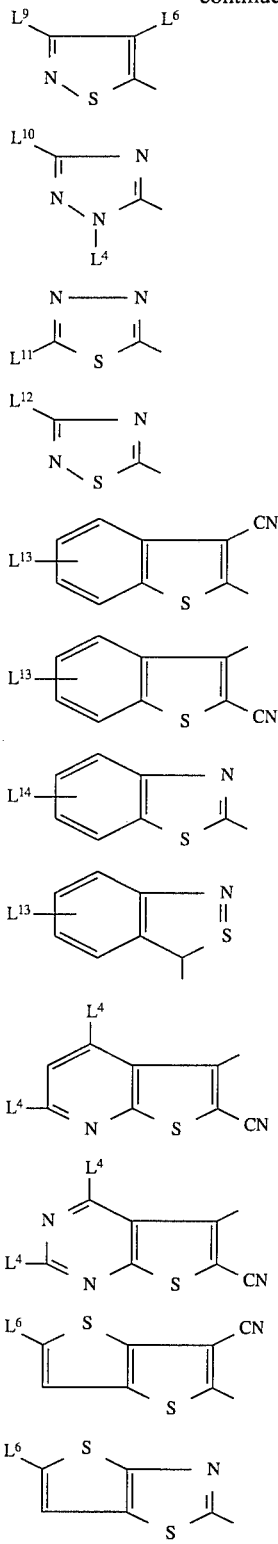

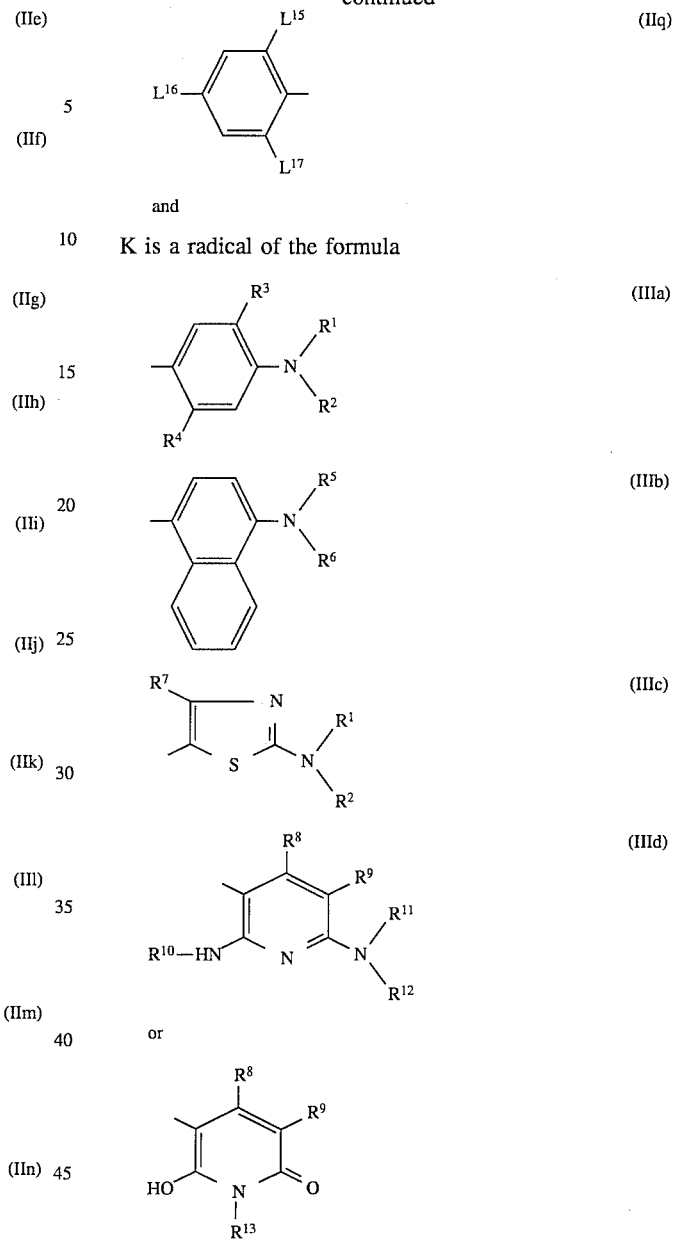

and

K is a radical of the formula where
- $L^1$ is nitro, cyano, $C_1$–$C_6$-alkanoyl, benzoyl, $C_1$–$C_6$-alkylsulfonyl, substituted or unsubstituted phenylsulfonyl or a radical of the formula —CH═T, where T is hydroximino, $C_1$–$C_4$-alkoximino or a radical of an acidic CH compound,
- $L^2$ is hydrogen, $C_1$–$C_6$-alkyl, halogen, hydroxyl, mercapto, unsubstituted or phenyl- or $C_1$–$C_4$-alkoxysubstituted $C_1$–$C_6$-alkoxy, substituted or unsubstituted phenoxy, unsubstituted or phenyl-substituted $C_1$–$C_6$-alkylthio, substituted or unsubstituted phenylthio, $C_1$–$C_6$-alkylsulfonyl or substituted or unsubstituted phenylsulfonyl,
- $L^3$ is cyano, $C_1$–$C_4$-alkoxycarbonyl or nitro,
- $L^4$ is hydrogen, $C_1$–$C_6$-alkyl or phenyl, $L^5$ is $C_1$–$C_6$-alkyl or phenyl, $L^6$ is hydrogen, cyano, $C_1$–$C_4$-alkoxycarbonyl, $C_1$–$C_6$-alkanoyl, thiocyanato or halogen, $L^7$ is nitro, cyano, $C_1$–$C_6$-alkanoyl, benzoyl, $C_1$–$C_4$-alkoxycarbonyl, $C_1$–$C_6$-alkylsulfonyl, substituted or unsubstituted phenylsulfonyl or a radical of the formula —CH=T, where T is as defined above, $L^8$ is hydrogen, $C_1$–$C_6$-alkyl, cyano, halogen, unsubstituted or phenyl- or $C_1$–$C_4$-alkoxy-substituted $C_1$–$C_6$-alkoxy, unsubstituted or phenyl-substituted $C_1$–$C_6$-alkylthio, substituted or unsubstituted phenylthio, $C_1$–$C_6$-alkylsulfonyl, substituted or unsubstituted phenylsulfonyl or $C_1$–$C_4$-alkoxycarbonyl, $L^9$ is cyano, unsubstituted or phenyl-substituted $C_1$–$C_6$-alkyl, unsubstituted or phenyl-substituted $C_1$–$C_6$-alkylthio, substituted or unsubstituted phenyl, thienyl, $C_1$–$C_4$-alkylthienyl, pyridyl or $C_1$–$C_4$-alkylpyridyl, L is phenyl or pyridyl, $L^{11}$ is trifluoromethyl, nitro, $C_1$–$C_6$-alkyl, phenyl, unsubstituted or phenyl-substituted $C_1$–$C_6$-alkylthio or $C_1$–$C_6$-dialkylamino, $L^{12}$ is $C_1$–$C_6$-alkyl, phenyl, 2-cyanoethylthio or 2-($C_1$–$C_4$-alkoxycarbonyl)ethylthio, $L^{13}$ is hydrogen, nitro or halogen, $L^{14}$ is cyano, $C_1$–$C_4$-alkoxycarbonyl, nitro or halogen, $L^{15}$ and $L^{17}$ are identical or different and each is independently of the others hydrogen, $C_1$–$C_6$-alkyl, $C_1$–$C_6$-alkoxy, halogen, nitro, cyano, $C_1$–$C_4$-alkoxycarbonyl, $C_1$–$C_6$-alkylsulfonyl or substituted or unsubstituted phenylsulfonyl, $R^1$ and $R^2$ are identical or different and each is independently of the other hydrogen, substituted or unsubstituted $C_1$–$C_6$-alkyl, which may be interrupted by 1 or 2 oxygen atoms in ether function, $C_5$–$C_7$-cycloalkyl or $C_3$–$C_6$-alkenyl, $R^3$ is hydrogen, $C_1$–$C_6$-alkyl or $C_1$–$C_6$-alkoxy, $R^4$ is hydrogen, $C_1$–$C_6$-alkyl, $C_1$–$C_6$-alkoxy, $C_1$–$C_6$-alkylsulfonylamino, substituted or unsubstituted $C_1$–$C_6$-alkanoylamino or benzoylamino, $R^5$ and $R^6$ are identical or different and each is independently of the other hydrogen or $C_1$–$C_6$-alkyl, $R^7$ is hydrogen, substituted or unsubstituted phenyl or thienyl, $R^8$ is hydrogen or $C_1$–$C_6$-alkyl, $R^9$ is cyano, carbamoyl or acetyl, $R^{10}$, $R^{11}$ and $R^{12}$ are identical or different and each is independently of the others substituted or unsubstituted $C_1$–$C_{12}$-alkyl, which may be interrupted by from 1 to 3 oxygen atoms in ether function, $C_5$–$C_7$-cycloalkyl, substituted or unsubstituted phenyl, $C_3$–$C_6$-alkanoyl, substituted or unsubstituted benzoyl, $C_1$–$C_8$-alkanoyl, $C_1$–$C_6$-alkylsulfonyl or substituted or unsubstituted phenylsulfonyl, or $R^{11}$ and $R^{12}$ together with the nitrogen atom joining them together are a 5- or 6-membered saturated heterocyclic radical which may contain further hetero atoms, and $R^{13}$ is hydrogen or $C_1$–$C_6$-alkyl.

Also of particular importance are disazo dyes of the formula IVa or IVb where $A^1$ is hydrogen, $C_1$–$C_6$-alkyl, $C_1$–$C_6$-alkoxy or nitro, $A^2$ is hydrogen or cyano, $A^3$ and $A^4$ are identical or different and each is independently of the other hydrogen, $C_1$–$C_6$-alkyl or $C_1$–$C_6$-alkoxy, $A^5$ is hydrogen, hydroxyl, $C_1$–$C_6$-alkoxy, amino or unsubstituted or cyano-substituted mono- or di($C_1$–$C_6$-alkyl)amino, $A^6$ is hydrogen, methyl or chlorine, and $A^7$ is cyano or $C_1$–$C_4$-alkoxycarbonyl.

Any alkyl or alkonyl appearing in the above-mentioned formulae can be straight-chain or branched.

Any substituted phenyl appearing in the above-mentioned formulae may have as substituents for example $C_1$–$C_4$-alkyl, chlorine, bromine, nitro or $C_1$–$C_4$-alkoxy. The number of substituents in substituted phenyl is in general from 1 to 3.

Any substituted alkyl appearing in the above-mentioned formulae may have as substituents for example hydroxyl, cyclohexyloxy, phenoxy, $C_1$–$C_4$-alkoxycarbonyl, $C_1$–$C_4$-alkanoyloxy, cyano, cyclohexyl or phenyl. The number of substituents in substituted alkyl is in general 1 or 2.

$L^2$, $L^4$, $L^5$, $L^8$, $L^9$, $L^{11}$, $L^{12}$, $L^{15}$, $L^{16}$, $L^{17}$, $R^1$, $R^2$, $R^3$, $R^4$, $R^5$, $R^6$, $R^8$, $R^{10}$, $R^{11}$, $R^{12}$, $R^{13}$, $A^1$, $A^3$ and $A^4$ are each for example methyl, ethyl, propyl, isopropyl, butyl, iso-butyl, sec-butyl, pentyl, isopentyl, neopentyl, tert-pentyl, hexyl or 2-methylpentyl.

$L^9$ may also be for example benzyl or 1- or 2-phenylethyl.

$L^2$, $L^8$, $L^9$ and $L^{11}$ may each also be for example methylthio, ethylthio, propylthio, isopropylthio, butylthio, isobutylthio, pentylthio, hexylthio, benzylthio or 1- or 2-phenylethyl.

$L^2$ and $L^8$ may each also be for example phenylthio, 2-methylphenylthio, 2-methoxyphenylthio or 2-chlorophenylthio.

$A^5$ is, and $L^2$, $L^8$, $L^{15}$, $L^{16}$, $L^{17}$, $R^3$, $R^4$, $A^1$, $A^3$ and $A^4$ may each also be, for example methoxy, ethoxy, propoxy, isopropoxy, butoxy, isobutoxy, sec-butoxy, pentyloxy, isopentyloxy, neopentyloxy, tert-pentyloxy, hexyloxy or 2-methylpentyloxy.

$L^6$ is, and $L^2$, $L^8$, $L^{13}$, $L^{14}$, $L^{15}$, $L^{16}$ and $L^{17}$ may each also be, for example fluorine, chlorine or bromine.

$L^7$ is, and $L^1$, $L^2$, $L^8$, $L^{15}$, $L^{16}$, $L^{17}$, $R^{10}$, $R^{11}$ and $R^{12}$ may each also be, for example methylsulfonyl, ethylsulfonyl, propylsulfonyl, isopropylsulfonyl, butylsulfonyl, isobutylsulfonyl, sec-butylsulfonyl, pentylsulfonyl, isopentylsulfonyl, neopentylsulfonyl, hexylsulfonyl, phenylsulfonyl, 2-methylphenylsulfonyl, 2-methoxyphenylsulfonyl or 2-chlorophenylsulfonyl.

$L^3$ and $A^7$ each are, and $L^6$, $L^7$, $L^8$, $L^{14}$, $L^{15}$, $L^{13}$ and $L^{17}$ may each also be, for example methoxycarbonyl, ethoxycarbonyl, propoxycarbonyl, isopropoxycarbonyl, butoxycarbonyl, isobutoxycarbonyl or sec-butoxycarbonyl.

$L^2$ and $L^8$ may each also be for example 2-methoxyethoxy, 2-ethoxyethoxy, 2- or 3-methoxypropoxy, 2- or 3-ethoxypropoxy, 2- or 4-methoxybutoxy, 2- or 4-ethoxybutoxy, 5-methoxypentyloxy, 5-ethoxypentyloxy, 6-methoxyhexyloxy, 6-ethoxyhexyloxy, benzyloxy or 1- or 2-phenylethoxy.

$A^5$ may also be for example methylamino, ethylamino, propylamino, isopropylamino, butylamino, pentylamino, hexylamino, 2-cyanoethylamino or bis(2-cyanoethyl)amino.

$L^{11}$ and $A^5$ may each also be for example dimethylamino, diethylamino, dipropylamino, diisopropylamino, dibutylamino, dipentylamino, dihexylamino or N-methyl-N-ethylamine.

$L^{12}$ may also be for example 2-methoxycarbonylethylthio or 2-ethoxycarbonylethylthio.

$R^1$, $R^2$, $R^{11}$, $R^{12}$ and $R^{13}$ may each also be for example cyclopentyl, cyclohexyl or cycloheptyl.

$L^9$ may also be for example phenyl, 2-, 3- or 4-methylphenyl, 2,4-dimethylphenyl, 2-, 3- or 4-methoxyphenyl, 2-, 3- or 4-chlorophenyl, 2-, 3- or 4-methoxyphenyl, 2- or 3-methylthienyl or 2-, 3- or 4-methylpyridyl.

$L^1$, $L^6$ and $L^7$ may each also be for example formyl, acetyl, propionyl, butyryl, pentanoyl or hexanoyl.

For $L^1$ or $L^7$ as —CH═T where T is derived from an acidic CH compoound $H_2T$, suitable acidic CH compounds $H_2T$ are for example compounds of the formulae

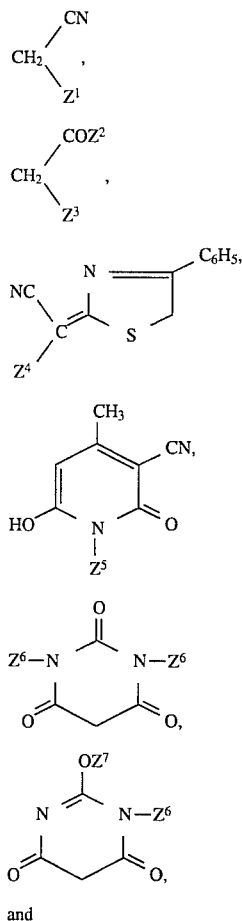

and

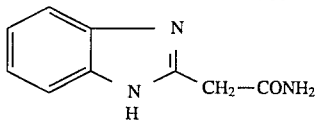

where
$Z^1$ is cyano, nitro, $C_1$–$C_4$-alkanoyl, substituted or unsubstituted benzoyl, $C_1$–$C_4$-alkylsulfonyl, substituted or unsubstituted phenylsulfonyl, carboxyl, $C_1$–$C_4$-alkoxycarbonyl, $C_3$–$C_4$-alkenyloxycarbonyl, phenoxycarbonyl, carbamoyl, mono- or di($C_1$–$C_4$-alkyl)carbamoyl, substituted or unsubstituted phenylcarbamoyl, substituted or unsubstituted phenyl, 2-benzothiazolyl, 2-benzimidazolyl, 5-phenyl-1,3,4-thiadiazol- 2-yl or 2-hydroxyquinoxalin-3-yl,
$Z^2$ is $C_1$–$C_4$-alkyl, $C_1$–$C_4$-alkoxy or $C_3$–$C_4$-alkenyloxy,
$Z^3$ is $C_1$–$C_4$-alkoxycarbonyl, $C_3$–$C_4$-alkenyloxycarbonyl, phenylcarbamoyl or 2-benzimidazolyl,
$Z^4$ is cyano, $C_1$–$C_4$-alkoxycarbonyl or $C_3$—$C_4$-alkyloxycarbonyl,
$Z^5$ is hydrogen or $C_1$–$C_6$-alkyl,
$Z^6$ is hydrogen, $C_1$–$C_4$-alkyl or phenyl, and
$Z^7$ is $C_1$–$C_4$-alkyl.

Preference is given to the radical derived from compounds of the formula Va, Vb or Vc where $Z^1$ is cyano, $C_1$–$C_4$-alkanoyl, $C_1$–$C_4$-alkoxycarbonyl or $C_3$–$C_4$-alkenyloxycarbonyl, $Z^2$ is $C_1$–$C_4$-alkyl, $C_1$–$C_4$-alkoxy or $C_3$–$C_4$-alkenyloxy, $Z^3$ is $C_1$–$C_4$-alkoxycarbonyl or $C_1$–$C_4$-alkenyloxycarbonyl, and $Z^4$ is cyano.

Particular preference is given to the radical derived from compounds of the formula Va, Vb or Vc where $Z^2$ is cyano, $C_1$–$C_4$-alkoxycarbonyl or $C_2$–$C_4$-alkenyloxycarbonyl, $Z^2$ is $C_1$–$C_4$-alkoxy or $C_2$–$C_4$-alkenyloxy, $Z^3$ is $C_1$–$C_4$-alkoxycarbonyl or $C_3$–$C_4$-alkenyloxycarbonyl, and $Z^4$ is cyano.

$R^{10}$, $R^{11}$ and $R^{12}$ may each also be for example heptyl, octyl, 2-ethylhexyl, nonyl, decyl, undecyl, dodecyl, 4,7-dioxanonyl, 4,8-dioxadecyl, 4,6-dioxaundecyl, 3,6,9-trioxaundecyl, 4,7,10-trioxaundecyl or 4,7,10-trioxadodecyl.

$R^1$, $R^2$, $R^{10}$, $R^{11}$ and $R^{12}$ may each also be for example 2-methoxyethyl, 2-ethoxyethyl, 2-propoxyethyl, 2-butoxyethyl, 2-isobutoxyethyl, 2- or 3-methoxypropyl, 1-methoxyprop-2-yl, 2- or 3-ethoxypropyl or 2- or 3-propoxypropyl, 3,6-dioxaheptyl, 3,6-dioxaoctyl, 4,7-dioxaoctyl, 2-hydroxyethyl, 3-hydroxypropyl, 4-hydroxybutyl, 2-cyclohexyloxyethyl, 2- or 3-cyclohexyloxypropyl, 2- or 4-cyclohexyloxybutyl, 2-phenoxyethyl, 2-phenoxypropyl, 3-phenoxypropyl, 4-phenoxybutyl, 2-methoxycarbonylethyl, 2-ethoxycarbonylethyl, 2- or 3-methoxycarbonylpropyl, 2- or 3-ethoxycarbonylpropyl, 2- or 3-butoxycarbonylpropyl, 4-methoxycarbonylbutyl, 4-ethoxycarbonylbutyl, 2-cyanoethyl, 2- or 3-cyanopropyl, 4-cyanobutyl, 2-cyclohexylalkyl, 2- or 3-cyclohexyl-propyl, benzyl, 1- or 2-phenylethyl, 2-acetyloxyethyl, 2-propionyloxyethyl, 2- or 3-acetyloxypropyl, prop-3-en-1-yl, 2-methyl-prop-2-en-1-yl, but-2-en-1-yl or but-3-en-1-yl.

$R^{11}$ and $R^{12}$ forming together with the nitrogen atom joining them together a five- or six-membered saturated heterocyclic radical which may contain further hetero atoms are for example pyrrolidinyl, piperidinyl, morpholinyl, thiomorpholinyl, thiomorpholinyl S,S-dioxide, piperazinyl or N-($C_1$–$C_4$-alkyl)piperazinyl, such as N-methyl- or N-ethylpiperazinyl.

$R^{10}$, $R^{11}$ and $R^{12}$ may each also be for example formyl, acetyl, propionyl, butyryl, isobutyryl, pentanoyl, hexanoyl, heptanoyl, octanoyl, 2-ethylhexanoyl, benzoyl, 2-, 3- or 4-methylbenzoyl, 2-, 3- or 4-methoxybenzoyl or 2-, 3- or 4-chlorobenzoyl.

As mentioned earlier, the azo dyes are known per se and described for example in Venkataraman (loc. cit.), EP-A-201 896, DE-A-3 108 077, U.S. Pat. No. 4,843,153, GB-A-1 546 803 and in the earlier European Patent Applications 92 116 096.6 and 92 119 335.5 or can be obtained by the methods mentioned therein.

The molecular sieves used for preparing the azo dye-containing molecular sieves of the invention are zeolites or phosphates having a zeolite structure, ie. non-zeolitic molecular sieves (NZMSs).

Zeolites are crystalline aluminosilicates which possess a highly ordered structure comprising a rigid three-dimensional network of $SiO_4$ and $AlO_4$ tetrahedra joined together by common oxygen atoms. The ratio of the silicon and aluminum atoms to oxygen is 1:2 (see Ullmanns Encyclopädie der technischen Chemie, 4th edition, Volume 24, page 575. The electrovalence of the aluminum-containing tetrahedra is balanced by the inclusion in the crystal of cations, for example an alkali metal or hydrogen ion. Cation exchange is possible. The spaces between the tetrahedra are occupied by water molecules prior to dehydration by drying or calcination.

Zeolites are usually employed in the acidic H form or in the neutral alkali metal form. Instead of aluminum the zeolite lattice may also contain other elements such as boron, gallium, iron, chromium, vanadium, arsenic, antimony, bismuth, beryllium or mixtures thereof, or the silicon may be replaced by another tetravalent element such as germanium, titanium, zirconium or hafnium.

According to their structure, zeolites are divided into different groups. For instance, in the mordenite group the zeolite structure is made up of chains and in the chabazite group it is made up of layers of tetrahedra, whereas in the faujasite group the tetrahedra are arranged in the form of polyhedra, for example in the form of a cuboctahedron composed of four- or six-membered rings. Depending on the manner of linking of the cuboctahedron, which results in voids and pores of different sizes, zeolites are classified as type A, L, X or Y.

The molecular sieves underlying the materials according to the invention are in particular zeolites of the mordenite group or zeolites of the faujasite type, e.g. Y-, X- or L-zeolites. This group of zeolites also includes the "bultrastable" zeolites of the faujasite type, ie. dealuminated zeolites. Processes for preparing such zeolites are described for example in Catalysis by Zeolites, Volume 5 in Studies in Surface Science and Catalysis, ed. B. Imelik et al., Elsevier Scientific Publishing Comp. 1980, p. 203; Crystal Structures of Ultra-stable Faujasites, Advances in Chemistry Series No. 101, American Chemical Society Washington, D.C., pp. 226 (1971), and in U.S. Pat. No. 4,512,961.

It is also advantageous to use zeolites of the pentasil type. Their common feature is the basic building block comprising a five-membered ring composed of $SiO_4$ tetrahedra. They are characterized by a high $SiO_2/Al_2O_3$ ratio and by a pore size between that of zeolites of type A and those of type X or Y.

These zeolites can have different chemical compositions. The zeolites in question are aluminum silicate, boron silicate, iron silicate, beryllium silicate, gallium silicate, chromium silicate, arsenic silicate, antimony silicate and bismuth silicate zeolites or mixtures thereof and also aluminum germanate, boron germanate, gallium germanate and iron germanate zeolites or mixtures thereof. The aluminosilicate zeolite is prepared for example from an aluminum compound, preferably aluminum hydroxide or aluminum sulfate, and a silicon component, preferably finely divided silica, in an aqueous amine solution, in particular in polyamines, such as 1,6-hexanediamine, 1,3-propanediamine or triethylenetetramine solution, with or in particular without the addition of an alkali metal or alkaline earth metal at from 100° to 220° C. under autogenous pressure. This includes the isotactic zeolites of EP-A-34 727 and EP-A-46 504. The aluminosilicate zeolites obtained have an $SiO_2/Al_2O_3$ ratio of from 10:1 to 40,000:1 depending on the choice of starting materials. Such aluminosilicate zeolites can also be synthesized in an ethereal medium such as diethylene glycol dimethyl ether, in an alcoholic medium, for example in methanol, ethanol, propanol, isopropanol, butanol, 1,2-ethanediol, 1,4-butanediol, 1,6-hexanediol or polyols, or in water.

Iron silicate zeolites are obtained for example from an iron compound, preferably iron(III) sulfate, and a silicon compound, preferably finely divided silica, in an aqueous amine solution, in particular 1,6-hexanediamine, with or without the addition of an alkali metal or alkaline earth metal at from 100° to 220° C. under autogenous pressure.

The usable high-silicon zeolites ($SiO_2/Al_2O_3 \geq 10:1$) also include the ZSM types, ferrierite, NU-1 and Silicalite® (from Union Carbide/UOP), a molecular sieve and silica polymorph.

Synthesized zeolite powders can be subjected to a molding operation. This produces molded shapes of various kinds, tablets, rings, strands, stars or cloverleaf shapes. Isolated, dried (at from 100° to 160° C., preferably at 110° C.) and calcined (at from 450° to 550° C., preferably at 500° C.) zeolites can be combined with a binder in a weight ratio of from 90:10 to 40:60 before molding into extrudates or tablets. Suitable binders are various aluminum oxides, in particular boehmite, amorphous aluminosilicates having an $SiO_2/Al_2O_3$ weight ratio of from 25:75 to 90:5, in particular 75:25, silica, in particular finely divided silica, mixtures of finely divided silica and finely divided aluminum oxide, titanium dioxide, zirconium(IV) oxide and also clay. After molding, the extrudates or pellets are dried at 110° C. for 16 hours and calcined at 500° C. for 16 hours.

Suitable moldings are also obtained on molding the isolated zeolite directly after drying and not subjecting it to a calcination until after molding. The synthesized zeolites can also be used in the pure form, without binder, as extrudates or tablets, in which case the extrusion or peptization aids which may be used are for example ethylcellulose, potato starch, stearic acid, formic acid, oxalic acid, acetic acid, nitric acid, ammonia, amines, silico esters, graphite or mixtures thereof. Preferably, however, the zeolites are used in powder form.

If the zeolite, on account of its manner of preparation, is present not in the acidic H-formbut, for example, in the alkali metal or alkaline earth metal-form, it can be completely or partially converted into the desired H-form by ion exchange, for example with ammonium ions, and subsequent calcination, or by treatment with acids.

To prepare the novel colorants of the invention it is also possible to use phosphates as molecular sieves. The phosphates in question are synthesized under hydrothermal conditions. These phosphates have a zeolite structure. There are different types, designated AlPOs, SAPOs, ElAPOs, ElSAPOs and MeAPOs and also VPI-5 and cloverite.

Phosphates of this type are described in the review article by E. M. Flanigen et al., Alumophosphate molecular sieves and the periodic table, Pure & Appl. Chem. 58 (1986), 1351–58.

U.S. Pat. No. 4,310,440 discloses a multiplicity of microporous alumophosphates (acronym: ALPOs). According to this reference, they are prepared by using as starting components not only phosphorus- and aluminum-containing compounds but also structure-forming template compounds. Usable templates include a large number of organic nitrogen compounds (e.g. amines, ammonium compounds or nitrogen heterocycles). Depending on the nature of the template and on the reaction conditions it is possible to prepare many different aluminophosphate structures, which are characterized by their different X-ray diffraction data. Existing alumophosphates differ in the structure of the void system, ie. in pore size, pore volume and surface area. These differences give rise to different properties, such as adsorption capacities, the ability to separate certain substances as catalytic activity.

Alumophosphates have a crystal lattice composed of $TO_4$ tetrahedra, where T atoms are phosphorus and aluminum. In general, the number of $AlO_4$ and $PO_4$ tetrahedra is the same, so that the crystal lattice does not carry a charge and no charge-balancing cations are therefore present either.

Microporous alumophosphates find application as adsorbents and also as catalysts or catalyst supports (review article: E. M. Flanigen et al., Structural, synthetic and physicochemical concepts in aluminophosphate-based molecular sieves, in Innovation in Zeolite Materials Science, P. J. Grobet et al. (eds.), Elsevier, 1988, pages 13 to 27).

The hydrothermally synthesized aluminum phosphates are for example ALPO-5, ALPO-8, ALPO-9, ALPO-11, ALPO-12, ALPO-14, ALPO-21, ALPO-25, ALPO-31, ALPO-33 and MCM9. Syntheses of these compounds are described for example in EP-A-132 708, U.S. Pat. No. 4,310,440 and in J. Amer. Chem. Soc. 104 (1982), 1146.

For example, $ALPO_4$-5 (ALPO-5) is synthesized by homogeneously mixing orthophosphoric acid with pseudoboehmite in water, adding tetrapropylammonium hydroxide and reacting at about 150° C. under autogenous pressure in an autoclave for from 20 to 60 h. The $ALPO_4$ is filtered off, dried at from 100° to 160° C. and calcined at from 450° to 550° C.

The preparation of a microporous alumophosphate designated ALPO-11 is described in Examples 32 to 36 of U.S. Pat. No. 4,310,440. According to this reference, the compound is synthesized by using as starting components phosphoric acid, an aluminum compound and also a dialkylamine, e.g. di-n-propylamine or diisopropylamine. The mixture is treated hydrothermally. The initial product is a microporous alumophosphate, the pores of which are packed with the template. By calcining it is possible to remove the template.

$ALPO_4$-9 (ALPO-9) is likewise synthesized from orthophosphoric acid and pseudoboehmite, but in aqueous DABCO (1,4-diazabicyclo[2.2.2] octane) solution at about 200° C. under autogenous pressure in the course of from 200 to 400 hours.

$ALPO_4$-21 (ALPO-21) is synthesized from orthophosphoric acid and pseudoboehmite in aqueous pyrrolidone solution at from 150° to 200°C. under autogenous pressure in the course of from 50 to 200 h.

According to U.S. Pat. No. 4,440,871, it is possible to occlude silicon additionally into the crystal lattice of these alumophosphates to arrive at silicoalumophosphates (acronym: SAPOs).

SAPOs are prepared similarly to ALPOs with an additional silicon source in the synthesis batch. The charge on the $AlO_4$, $PO_4$ and $SiO_4$ tetrahedra in the SAPO crystal lattice does not in general balance, resulting in a charged lattice whose charge must be balanced by counterions.

For this reason SAPOs can be used not only for the purposes mentioned in connection with the ALPOs but also as ion exchangers. Furthermore, in their H-form SAPOs are solid acids and can accordingly be used for example as Bransted-acidic catalysts.

Suitable silicon aluminum phosphates are for example SAPO-5, SAPO-8, SAPO-11, SAPO-31 and SAPO-31. The synthesis of these compounds is described for example in EP-A-103 117 and U.S. Pat. No. 4,440,871. These silicon aluminum phosphates have a zeolite structure. SAPOs are prepared by crystallization from an aqueous mixture at from 100° to 250° C. under autogenous pressure in the course of from 2 hours to 2 weeks, the reaction mixture comprising a silicon, an aluminum and a phosphorus component being reacted in aqueous organoamine solutions.

SAPO-5 is obtained for example by mixing silica, suspended in aqueous tetrapropylammonium hydroxide solution, with an aqueous suspension of pseudoboehmite and orthophosphoric acid and subsequent reaction at from 150° to 200° C. for from 20 to 200 hours under autogenous pressure in a stirred autoclave. The powder is filtered off, dried at from 110° to 168° C. and calcined at from 450° to 550°0 C.

The preparation of a microporous silicoalumophosphate designated SAPO-11 is described in Examples 15 to 22 of U.S. Pat. No. 4,440,871, and proceeds analogously to ALPO-11, the only difference being that the reaction batch additionally contains a reactive silicon source.

ALPO-11 and SAPO-11 have the same structure, described for example by Bennett et al., Zeolites (1987), 160. The structure is classified as AEL in Meier and Olson's Atlas of Zeolite Structure Types, 2nd ed., Butterworths, London, 1987.

Suitable silicon aluminum phosphates also include for example ZYT-5, ZYT-6, ZYT-7, ZYT-9, ZYT-11 and ZYT-12 (JP-A-217 619/1984).

Nonzeolitic molecular sieves also include the phosphates, for example aluminum phosphate and silicon aluminum phosphate, having the VPI-5 structure, and cloverite (gallium phosphate).

The aluminum phosphate VPI-5 is a molecular sieve having uniform one-dimensional channels and extremely large pores 18 tetrahedron atoms in size and a free access diameter of about 12 Å. The synthesis of this substance is described for example in M. E. Davis et al., ACS Symp. Ser. 398 (1989), p. 291–304. Aqueous phosphoric acid is added to an aqueous suspension of boehmite, followed after an aging phase of from 1.5 to 2 hours by n-diisopropylamine with stirring. This reaction mixture is stirred at 142° C. for 20–24 hours. The properties and characteristics of these materials are described for example in J. Phys. Chem. 95 (1991), 1380, Zeolites 11 (1991), 583, and J. Amer. Chem. Soc. 111 (1989), 3919. The silicon-containing aluminum phosphate with a VPI-5 structure is likewise known and can also be used for preparing the compounds of the invention.

Cloverite is a cubic gallium phosphate molecular sieve having a pore opening formed by 20 tetrahedron atoms and a three-dimensional channel system. The maximum pore diameter is about 14 Å. The supercage at the intersections of the channels has a diameter from 29 to 30 Å. The synthesis and structure of this material are described in Nature 352 (1991), 281, 320. This gallium phosphate with a microporous crystal structure is likewise suitable for preparing the colorants of the invention, in particular for the incorporation of the bulkier molecules.

Isolated, dried (at from 100° to 160° C. preferably at 110° C.) and calcined (at from 450° to 550° C., preferably at 500° C.), these phosphates having a zeolite structure can be combined with a binder in a weight ratio of from 90:10 to 40:60 before molding into extrudates, tablets, cloverleaf forms, rings, wheels or monolithic structures. Suitable binders are various aluminum oxides, in particular boehmite, amorphous aluminosilicates having an $SiO_2/Al_2O_3$ weight ratio of from 25:75 to 90:5, in particular 75:25, silica, in particular finely divided silica, mixtures of finely divided silica and finely divided aluminum oxide and also clay. After molding, the extrudates or pellets are dried at 110° C. for 16 hours and calcined at 500° C. for 16 hours.

Suitable moldings are also obtained on molding the isolated phosphate directly after drying and not subjecting it to a calcination until after molding. The synthesized phosphates can also be used in the pure form, without binder, as extrudates or tablets, in which case the extrusion or peptization aids which may be used are for example ethylcellulose, potato starch, stearic acid, formic acid, oxalic acid, acetic acid, nitric acid, ammonia, amines, silico esters, graphite or mixtures thereof.

If the phosphate, for example silicon aluminum phosphate, on account of its manner of preparation, is present not in the acidic H-form but, for example, in the Na-form or in another alkali metal or alkaline earth metal form, it can be completely or partially converted into the desired H-form by ion exchange, for example with ammonium ions, and subsequent calcination, or by treatment with acids.

The pore size of the crystalline molecular sieves is customarily from 4 to 14 Å, preferably from 5 to 12 Å, in particular from 5 to 8 Å. The maximum diameter of the supercages within the molecular sieves is from 29 to 30 Å.

In the products of the invention, the occluded azo dyes are not merely reversibly adsorbed.

The bond between the azo dye and the molecular sieve is in fact in general so strong that there is virtually no desorption of the dye on energy being supplied, for example by heating. All that may happen at relatively high temperatures is that the azo dye will decompose. This is due to the favorable choice of the dimensions of the azo dye and of the molecular sieve pores and due to the chemical properties of dye and sieve (for example degree of hydrophilicity or polarity), which results in very stable inclusion compounds.

To obtain a stable occlusion or inclusion compound, the steric and electronic properties of the azo dye and of the molecular sieve must accordingly match.

A very large azo dye is for example incapable of getting into the pore system of a narrow pored molecular sieve. In the course of the abovementioned treatment the dye would at most be adsorbed onto the outer surface of the molecular sieve, from where it is sublimed away at the final temperature of the treatment and/or washed away in the course of the solvent treatment.

It is true that a very small dye molecule will fit readily into a wide-pored molecular sieve; but in this case the interaction between dye and sieve will be so weak that it will be relatively easy for the azo dye to be washed out, for example in a Soxhlet extraction.

The molecular sieve immobilizes the originally soluble dye, as a result of which the occlusion compound possesses improved stability to solvents. The molecular sieve lattice occluding the azo dye can also offer improved protection to acid and alkaline solutions and also enhanced stability to temperature and radiation effects.

In general, the products of the invention contain from 0.01 to 20% by weight, preferably from 0.05 to 15% by weight, in particular from 1 to 10% by weight of azo dye, each percentage being based on the weight of the molecular sieve.

There are several ways of occluding the azo dyes. One option is to treat a mixture of customarily calcined molecular sieve and azo dye at elevated temperatures. A precondition is in general a steric and electronic match between the dye molecule and the pore system of the molecular sieve.

In the case of readily sublimable azo dyes it is advisable to carry out the treatment under reduced pressure. The treatment of the mixture can be facilitated by the addition of a solvent for the azo dye.

In one embodiment of this method, the mixture of azo dye and molecular sieve is heated under a pressure of less than 1 bar, preferably less than 50 mbar, in particular less than 10 mbar, very particularly less than 1 mbar, to 50°–300° C., preferably 100°–250° C. The temperture is maintained for from 0.1 to 100 minutes. After this treatment excess dye, ie. dye not bound within the molecular sieve, can be removed by suitable treatment, for example by means of Soxhlet extraction.

Another way of preparing the novel compounds is to synthesize the azo dye from suitable starting materials, for example from diazo and coupling components, in the presence of calcined molecular sieve. For this the starting molecules must be selected in size in such a way that they fit into the voids of the molecular sieve. The reaction conditions for this synthesis must be such that the structure of the molecular sieve is not destroyed.

After the synthesis of the azo dye in the pores of the molecular sieve, excess starting material and azo dye formed outside the pores are removed by suitable treatment, for example by means of a solvent.

A further way of preparing the inclusion compound is to synthesize the molecular sieve in the presence of the azo dye. For this the azo dye and optionally a further template are added to a customary molecular sieve synthesis mixture, comprising for example a silicon source and optionally an aluminum source. The mixture is treated hydrothermally in an autoclave at from 100° to 250° C. The product formed is filtered off and treated with suitable solvents to remove unconverted starting materials.

In contradistinction to the method for preparing mordenite with dyes in the synthesis batch described in EP-A-182 542, the azo dye survives as template within the pore system of the synthesized molecular sieve.

The inclusion compounds frequently differ even in color from the original azo dye and from the molecular sieve.

These differences can be quantified by UV or reflectance spectra. One frequent result of including the azo dye in the molecular sieve is also a distinct enhancement of the brilliance.

The X-ray diffractogram of the inclusion compound in general shows the lines of the original molecular sieve. The exact position and intensity of the diffractional lines of the inclusion compound frequently differs somewhat from those of the untreated molecular sieve—an effect explained inter alia by a slight change in the geometry of the elemental cell due to the occluded dye molecules.

The inclusion compound does not in general show diffractional lines of the pure dye, since the dye adapts to the structure of the molecular sieve and loses the structure of its pure solid form.

Chemical analysis of the inclusion compounds reveals a carbon content of from 0.1 to 20%, corresponding to the azo dye content.

The thermal stability of the inclusion compounds was apparent from thermogravimetric experiments. Whereas pure azo dye frequently decomposes or sublimes at temperatures below 200° C. the novel material remains intact at up to more than 400° C.; it is only at above 500° C. that the azo dye occluded in the molecular sieve decomposes.

The azo dye-containing crystalline molecular sieves of the invention are advantageous for use as colorants, especially as pigments. In this use they are notable for good fastness properties, high brilliance and thermal stability. They are also resistant to the action of solvents.

A particular use of the novel colorants is for pigmenting paints, plastics, ceramics or materials produced via sol-gel products.

There is also the possibility of storing information through specific modification of the dye fixed within the molecular sieve structure. As a consequence of the regular arrangement of the voids in the molecular sieves, the molecules of the azo dyes must also be in a regular arrangement in the novel compounds. This arrangement can have a pronounced effect on the linear and nonlinear optical properties (Angew. Chem. 96 (1984), 637–51), which makes it possible to use the material as an optical element.

There are also photochemical and catalytic possibilities for the novel material.

Embodiments of the invention will now be more particularly described by way of example.

The azo dyes used in the Examples are for simplicity referred to by the letters A to U. The structural formulae of these dyes are summarized in Table 1.

TABLE 1

| Identifier | Formula |
|---|---|
| A | $\text{O}_2\text{N}-\text{C}_6\text{H}_4-\text{N}=\text{N}-\text{C}_6\text{H}_4-\text{N}(\text{CH}_3)(\text{CH}_3)$ |
| B | $\text{O}_2\text{N}-\text{C}_6\text{H}_4-\text{N}=\text{N}-\text{C}_6\text{H}_4-\text{N}(\text{C}_3\text{H}_7)(\text{C}_2\text{H}_4\text{OCOCH}_3)$ |
| C | $\text{O}_2\text{N}-\text{C}_6\text{H}_3(\text{Cl})(\text{Br})-\text{N}=\text{N}-\text{C}_6\text{H}_3(\text{Cl})-\text{N}(\text{C}_2\text{H}_4\text{OH})(\text{C}_2\text{H}_4\text{OH})$ |
| D | $\text{O}_2\text{N}-\text{C}_6\text{H}_3(\text{CN})-\text{N}=\text{N}-\text{C}_6\text{H}_4-\text{N}(\text{C}_3\text{H}_7)(\text{C}_2\text{H}_4\text{CN})$ |
| E | $\text{O}_2\text{N}-\text{C}_6\text{H}_3(\text{CN})-\text{N}=\text{N}-\text{[pyridine ring with CH}_3,\text{CN},\text{HN-C}_2\text{H}_4\text{OH}]-\text{NH-C}_4\text{H}_8\text{OC}_2\text{H}_5$ |
| F | $\text{O}_2\text{N}-\text{C}_6\text{H}_4-\text{C(=N-S)}=\text{N}-\text{C}_6\text{H}_4-\text{N}(\text{C}_2\text{H}_5)(\text{C}_2\text{H}_4\text{COOCH}_3)$ |
| G | [thiophene ring with Cl, CN, OHC, S]$-\text{N}=\text{N}-\text{C}_6\text{H}_3(\text{NHCOCH}_3)-\text{N}(\text{C}_2\text{H}_5)(\text{C}_2\text{H}_5)$ |

TABLE 1-continued
| Identifier | Formula |
|---|---|
| H | 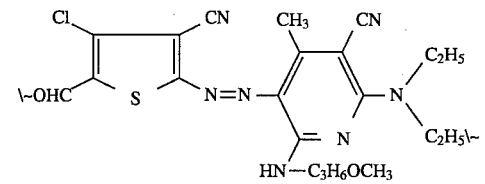 |
| I | 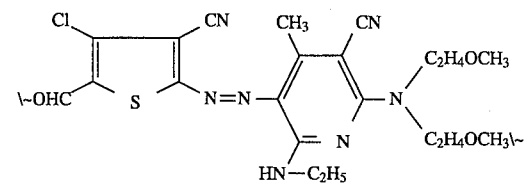 |
| K | 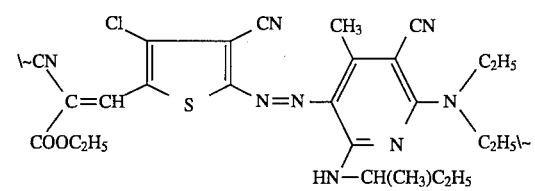 |
| L | 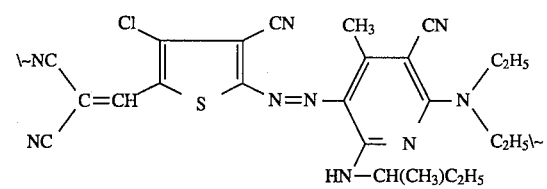 |
| M | 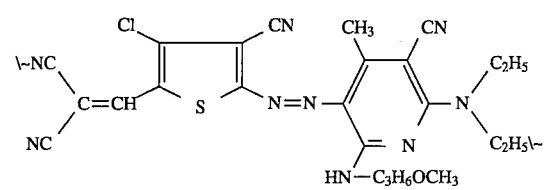 |
| N | 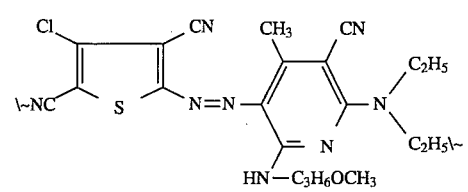 |
| O | 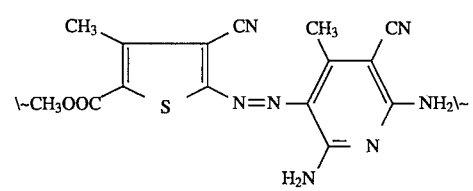 |
| P | 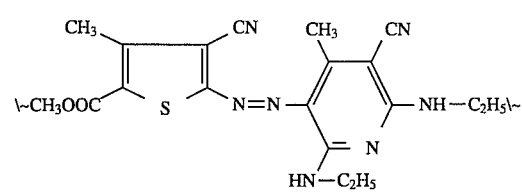 |

TABLE 1-continued

| Identifier | Formula |
|---|---|
| Q | \-CH₃OOC−[thiophene with CH₃, CN]−N=N−[ring with CH₃, CN, =N, HN−C₃H₆OCH₃]−NH−C₂H₄OCOCH₃\- |
| R | \-CH₃−[thiophene with COOCH₃, NC]−N=N−[ring with CH₃, CN, =N, HN−CH(CH₃)CH₂OCH₃]−NH−C₆H₅\- |
| S | \-CH₃−[thiophene with COOCH₃, NC]−N=N−[ring with CH₃, CN, =N, HN−C₂H₄OCH₃]−N(C₃H₆OCH₃)(C₂H₅)\- |
| T | \-O₂N−[phenyl]−N=N−[phenyl with OCH₃]−N=N−[phenyl]−OH\- |
| U | \-[phenyl]−N=N−[phenyl]−N=N−[substituted ring with HO, N−CH₃, O]\- |

The molecular sieves used in the Examples were either prepared in-house by following a literature method or acquired commercially. Table 2 shows the method of preparation or the source of supply for the molecular sieves used as well as their identifier.

TABLE 2

| Identifier | Name | Structure (zeolite atlas) | Source |
|---|---|---|---|
| I | AlPO₄-5 | AFI | Preparation as per US-A-4 310 440, Ex. 7 |
| II | AlPO₄-11 | AEL | Preparation as per US-A-4 310 440, Ex. 32 |
| III | VPI-5 | VFI | Preparation as per WO-A-89/01912 |
| IV | ZSM-5 | MFI | Commercially available from Uetikon |
| V | ZSM-11 | MEL | Preparation as per US-A-3 709 979 |
| VI | ZSM-12 | MTW | Preparation as per US-A-3 832 449 |
| VII | L-zeolite | LTL | Commercially available from Bayer |
| VIII | US-Y-zeolite | FAU | Commercially available from Grace |
| IX | Mordenite | MOR | Commercially available from P.Q. |

EXAMPLES 1 TO 33

General method of preparation by occlusion from the gas phase 10 g of freshly calcined molecular sieve are mixed with 0.5 g of azo dye and gradually heated at a rate of 1° C./min under a pressure of 1 mbar. On attainment of the sublimation temperature of the azo dye the temperature is held constant for about 30 minutes. In the course of this period the azo dye sublimes into the pores of the molecular sieve. After the sublimation has ended, the temperature is raised by a further 10°–20° C. to the so-called final temperature in order in this way to sublime away excess dye or dye present on the outer surface of the molecular sieve. The sublimate can be collected on a cold finger.

The stability of the occlusion compound is tested by treating it repeatedly with a boiling solvent, for example acetone, acetonitrile or ethanol. Alternatively, it is also possible to carry out a Soxhlet extraction. If an occlusion compound is stable to this treatment, virtually no dye will transfer from the molecular sieve into the solvent.

Table 3 shows the identifiers for the azo dyes and the molecular sieves, the sublimation temperature, the final temperature, the color of the occlusion compound and also spectral data ($\lambda_{max}$ values of K/S spectrum) of paint films produced as described in Examples 43 and 44.

TABLE 3

| Example | Dye | Molecular sieve | Sublimation temperature [°C.] | Final temperature [°C.] | Color of occlusion compound | Spectral data $\lambda_{max}$ [nm] |
|---|---|---|---|---|---|---|
| 1 | F | I | 200 | 220 | bluish gray | 614 |
| 2 | F | II | 200 | 220 | grayish black | 610 |
| 3 | G | I | 200 | 220 | bluish gray | 602 |
| 4 | K | VIII | 230 | 250 | whitish gray | 603 |
| 5 | L | VIII | 220 | 240 | beige | 622 |
| 6 | H | VIII | 180 | 200 | violet | 564 |
| 7 | M | VIII | 220 | 240 | brownish green | 557 |
| 8 | O | VIII | 240 | 250 | brownish orange | 511 |
| 9 | P | VIII | 190 | 210 | red | 552 |
| 10 | I | VIII | 180 | 200 | violet | 554 |
| 11 | R | VIII | 220 | 240 | pinkish violet | 540 |
| 12 | N | VIII | 190 | 210 | violet | 550 |
| 13 | S | VIII | 180 | 200 | violet | 542 |
| 14 | H | IX | 180 | 200 | violet | 544 |
| 15 | P | IX | 190 | 210 | reddish brown | |
| 16 | N | IX | 190 | 210 | violet | |
| 17 | U | VIII | 240 | 250 | yellowish brown | |
| 18 | P | IV | 190 | 210 | pink | |
| 19 | T | IV | 250 | 250 | reddish brown | |
| 20 | C | IV | 240 | 250 | brown | |
| 21 | A | VIII | 120 | 140 | brown | |
| 22 | D | VIII | 200 | 220 | gray | |
| 23 | B | VIII | 200 | 220 | gray | |
| 24 | Q | VIII | 160 | 180 | carmine | |
| 25 | D | IV | 200 | 220 | light brown | |
| 26 | B | IV | 200 | 220 | brown | |
| 27 | Q | IV | 160 | 180 | gray | |
| 28 | D | I | 200 | 220 | violet | |
| 29 | B | I | 200 | 220 | orange | |
| 30 | Q | I | 160 | 180 | red | |
| 31 | T | VIII | 250 | 250 | brown | |
| 32 | C | VIII | 240 | 250 | reddish brown | |
| 33 | A | VIII | 120 | 140 | light brown | |

TABLE 4

| Example | Dye | Molecular sieve | Solvent | Color of occlusion compound | Spectral data $\lambda_{max}$ [nm] |
|---|---|---|---|---|---|
| 34 | F | I | ethanol | gray | 618 |
| 35 | F | II | ethanol | light blue | 620 |
| 36 | G | I | ethanol | light gray | 604 |
| 37 | F | VIII | ethanol | bluish white | |
| 38 | G | VIII | ethanol | grayish blue | |
| 39 | I | VIII | ethanol | pink | |
| 40 | I | IX | ethanol | violet | |

EXAMPLES 41 AND 42

Examples 41 and 42 illustrate that it is possible to synthesize an azo dye directly within the pore system of a molecular sieve. 10 g of a molecular sieve are ion-exchanged with an ethanolic diazoniumsalt solution, then repeatedly washed with ethanol and dried. The substance has a slightly yellowish color. Reaction of the ion-exchanged molecular sieve with a suitable coupling component produces an azo dye.

Table 5 shows the identifiers for the diazonium salts, molecular sieves and compound components, the solvent and the color of the occlusion compound.

TABLE 5

| Example | Diazonium salt | Molecular sieve | Coupling component | Solvent | Color of occlusion compound |
|---|---|---|---|---|---|
| 41 | 4-nitro-benzene-diazonium tetrafluoroborate | VIII | o-toluidine | ethanol | deep red |
| 42 | 4-nitro-benzene-diazonium tetrafluoroborate | IV | o-toluidine | ethanol | reddish orange |

EXAMPLES 34 TO 40

General method of preparation by occlusion from solution 10 g of freshly calcined molecular sieve are added to a solution of 0.5 g of azo dye in 100 ml of solvent and the mixture is refluxed for 2 hours.

The colored occlusion compound is filtered off and repeatedly washed with pure boiling solvent, for example with N,N-dimethylformamide, N-methylpyrrolidinone, nitrobenzene, trichlorobenzene, xylene, ethanol, acetone, tetrahydrofuran or acetonitrile (test for resistance to solvent). Alternatively, a Soxhlet extraction can be carried out. If an occlusion compound is stable to this treatment, virtually no dye transfers from the molecular sieve into the solvent.

Table 4 shows the identifiers for the azo dyes and the molecular sieves, the solvent used, the color of the occlusion compound and spectral data ($\lambda_{max}$ value of K/S spectrum) of paint films produced as described in Examples 43 and 44.

EXAMPLE 43

(USE)

General method for producing a paint film 2.5 g of dye-containing molecular sieve are mixed with 47.5 g of commercial baking finish based on alkyd-melamine. For this 50 ml of glass beads (diameter: 3–4 mm) are added and the mixture is dispersed for minutes in a commercial mixer.

The resulting dispersion is applied to gloss paper with a 150 μm wire-wound draw bar. After a minute solvent flashoff the film is baked at 130° C. for minutes.

EXAMPLE 44

(USE)

The film is produced as described in Example 43 except that 5 g of a white coating with a TiO$_2$ content of 25 % by weight are added before the dispersing.

We claim:

1. Crystalline molecular sieves which are thermally stable up to 500° C. and contain one or more chromophores of the class of the mono- or polyazo dyes that are devoid of acidic groups, except those monoazo dyes of the azobenzene series with a diphenylamine coupling component.

2. Crystalline molecular sieves as claimed in claim 1 containing one or more monoazo dyes.

3. Crystalline molecular sieves as claimed in claim 1 containing one or more monoazo dyes with a diazo component derived from an aniline or from a five-membered aromatic heterocyclic amine which has from one to three hetero atoms selected from the group consisting of nitrogen, oxygen and sulfur in the heterocyclic ring and may be fused with a benzene, thiophene, pyridine or pyrimidine ring.

4. Crystalline molecular sieves as claimed in claim 1 of the class of the zeolites or of the class of the phosphates with a zeolite structure.

5. A method of coloring a composition, comprising the step of adding the crystalline molecular sieves of claim 1 thereto.

6. The crystalline molecular sieves as claimed in claim 1, wherein said dyes have the following formula:

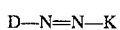

where

D is a radical of the formula

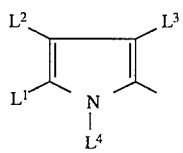 (IIa)

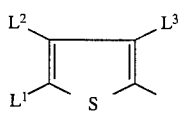 (IIb)

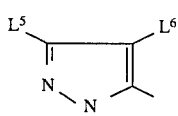 (IIc)

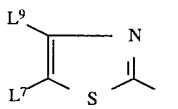 (IId)

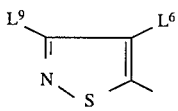 (IIe)

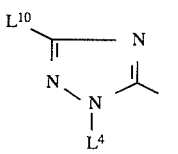 (IIf)

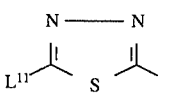 (IIg)

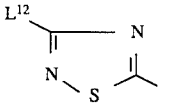 (IIh)

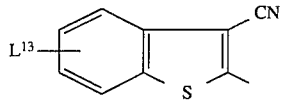 (IIi)

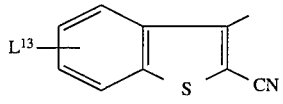 (IIj)

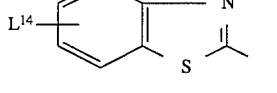 (IIk)

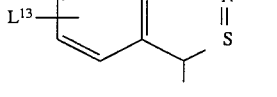 (IIl)

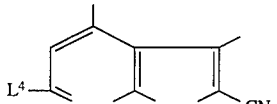 (IIm)

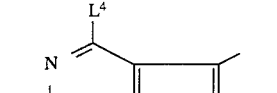 (IIn)

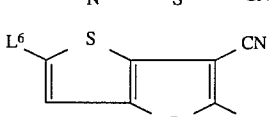 (IIo)

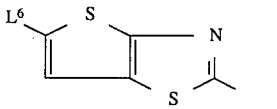 (IIp)

or

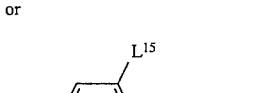 (IIq)

and

K is a radical of the formula

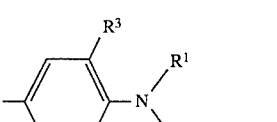 (IIIa)

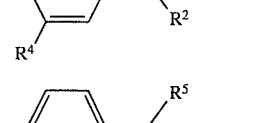 (IIIb)

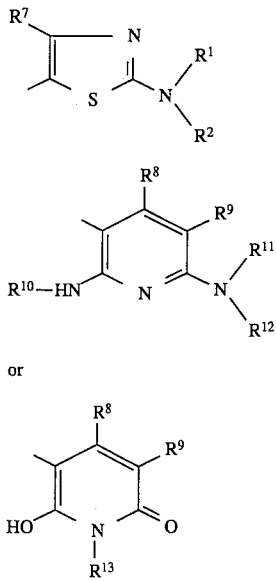

where $L^1$ is nitro, cyano, $C_1$–$C_6$-alkanoyl, benzoyl, $C_1$–$C_6$-alkylsulfonyl, substituted or unsubstituted phenylsulfonyl or a radical of the formula —CH=T, where T is hydroximino, $C_1$–$C_4$-alkoximino or a radical of an acidic CH compound, $L^2$ is hydrogen, $C_1$–$C_6$-alkyl, halogen, hydroxyl, mercapto, unsubstituted or phenyl- or $C_1$–$C_4$-alkoxysubstituted $C_1$–$C_6$-alkoxy, substituted or unsubstituted phenoxy, unsubstituted or phenyl-substituted $C_1$–$C_6$-alkylthio, substituted or unsubstituted phenylthio, $C_1$–$C_6$-alkylsulfonyl or substituted or unsubstituted phenylsulfonyl, $L^3$ is cyano, $C_1$–$C_4$-alkoxycarbonyl or nitro, $L^4$ is hydrogen, $C_1$–$C_6$-alkyl or phenyl, $L^5$ is $C_1$–$C_6$-alkyl or phenyl, $L^6$ is hydrogen, cyano, $C_1$–$C_4$-alkoxycarbonyl, $C_1$–$C_6$-alkanoyl, thiocyanato or halogen, $L^7$ is nitro, cyano, $C_1$–$C_6$-alkanoyl, benzoyl, $C_1$–$C_4$-alkoxycarbonyl, $C_1$–$C_6$-alkylsulfonyl, substituted or unsubstituted phenylsulfonyl or a radical of the formula —CH=T, where T is as defined above, $L^8$ is hydrogen, $C_1$–$C_6$-alkyl, cyano, halogen, unsubstituted or phenyl- or $C_1$–$C_6$-alkoxy-substituted $C_1$–$C_6$-alkoxy, unsubstituted or phenyl-substituted $C_1$–$C_6$-alkylthio, substituted or unsubstituted phenylthio, $C_1$–$C_6$-alkylsulfonyl, substituted or unsubstituted phenylsulfonyl or $C_1$–$C_4$-alkoxycarbonyl, $L^9$ is cyano, unsubstituted or phenyl-substituted $C_1$–$C_6$-alkyl, unsubstituted or phenyl-substituted $C_1$–$C_6$-alkylthio, substituted or unsubstituted phenyl, thienyl, $C_1$–$C_4$-alkylthienyl, pyridyl or $C_1$–$C_4$-alkylpyridyl, $L^{10}$ is phenyl or pyridyl, $L^{11}$ is trifluoromethyl, nitro, $C_1$–$C_6$-alkyl, phenyl, unsubstituted or phenyl-substituted $C_1$–$C_6$-alkylthio or $C_1$–$C_6$-dialkylamino, $L^{12}$ is $C_1$–$C_6$-alkyl, phenyl, 2-cyanoethylthio or 2-($C_1$–$C_4$-alkoxycarbonyl)ethylthio, $L^{13}$ is hydrogen, nitro or halogen, $L^{14}$ is hydrogen, cyano, $C_1$–$C_4$-alkoxycarbonyl, nitro or halogen, $L^{15}$, $L^{16}$ and $L^{17}$ are identical or different and each is independently of the others hydrogen, $C_1$–$C_6$-alkyl, $C_1$–$C_6$-alkoxy, halogen, nitro, cyano, $C_1$–$C_4$-alkoxycarbonyl, $C_1$–$C_6$-alkylsulfonyl or substituted or unsubstituted phenylsulfonyl, $R^1$ and $R^2$ are identical or different and each is independently of the other hydrogen, substituted or unsubstituted $C_1$–$C_6$-alkyl, which may be interrupted by 1 or 2 oxygen atoms in ether function, $C_5$–$C_7$-cycloalkyl or $C_3$–$C_6$-alkenyl, $R^3$ is hydrogen, $C_1$–$C_6$-alkyl or $C_1$–$C_6$-alkoxy, $R^4$ is hydrogen, $C_1$–$C_6$-alkyl, $C_1$–$C_6$-alkoxy, $C_1$–$C_6$-alkylsulfonylamino, substituted or unsubstituted $C_1$–$C_6$-alkanoylamino or benzoylamino, $R^5$ and $R^6$ are identical or different and each is independently of the other hydrogen or $C_1$–$C_6$-alkyl, $R^7$ is hydrogen, substituted or unsubstituted phenyl or thienyl, $R^8$ is hydrogen or $C_1$–$C_6$-alkyl, $R^9$ is cyano, carbamoyl or acetyl, $R^{10}$, $R^{11}$ and $R^{12}$ are identical or different and each is independently of the others substituted or unsubstituted $C_1$–$C_{12}$-alkyl, which may be interrupted by from 1 to 3 oxygen atoms in ether function, $C_5$–$C_7$-cycloalkyl, substituted or unsubstituted phenyl, $C_3$–$C_6$-alkanoyl, substituted or unsubstituted benzoyl, $C_1$–$C_8$-alkanoyl, $C_1$–$C_6$-alkylsulfonyl or substituted or unsubstituted phenylsulfonyl, or $R^{11}$ and $R^{12}$ together with the nitrogen atom joining them together are a 5- or 6-membered saturated heterocyclic radical which may contain further hetero atoms, and $R^{13}$ is hydrogen or $C_1$–$C_6$-alkyl.

7. The crystalline molecular sieves as claimed in claim 6, wherein said substituted phenyl is substituted from 1 to 3 times with substituents selected from the group consisting of $C_1$–$C_4$-alkyl, chlorine, bromine, nitro and $C_1$–$C_4$-alkoxy, and wherein said substituted alkyl is substituted from 1 to 2 times with substituents selected from the group consisting of hydroxyl, cyclohexyloxy, phenoxy, $C_1$–$C_4$-alkoxycarbonyl, $C_1$–$C_4$-alkanoyloxy, cyano, cyclohexyl and phenyl.

8. The crystalline molecular sieves as claimed in claim 1, wherein said dyes are selected from the group consisting of those dyes of the following formulae:

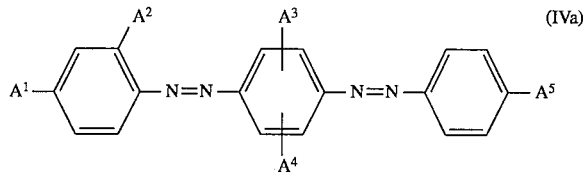

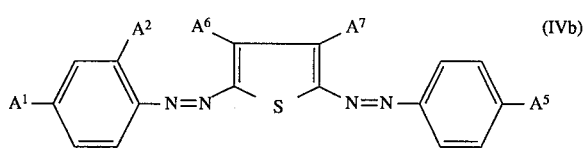

where $A^1$ is hydrogen, $C_1$–$C_6$-alkyl, $C_1$–$C_6$-alkoxy or nitro, $A^2$ is hydrogen or cyano, $A^3$ and $A^4$ are identical or different and each is independently of the other hydrogen, $C_1$–$C_6$-alkyl or $C_1$–$C_6$-alkoxy, $A^5$ is hydrogen, hydroxyl, $C_1$–$C_6$-alkoxy, amino or unsubstituted or cyano-substituted mono- or di($C_1$–$C_6$-alkyl)amino, $A^6$ is hydrogen, methyl or chlorine, and $A^7$ is cyano or $C_1$–$C_4$-alkoxycarbonyl.

9. The crystalline molecular sieves as claimed in claim 1, wherein said dyes are soluble dyes and are occluded within said sieves and wherein said sieves contain from 0.05% to 15% by weight of said azo dye based on the weight of the molecular sieve.

10. The crystalline molecular sieves as claimed in claim 6, wherein said dyes are soluble dyes and are occluded within said sieves and wherein said sieves contain from 0.05% to 15% by weight of said azo dye based on the weight of the molecular sieve.

* * * * *